Jan. 16, 1951　　　　G. H. MAVRAKIS　　　　2,538,576
FISHING CREEL OR BASKET
Filed April 23, 1947　　　　　　　　　　2 Sheets-Sheet 2
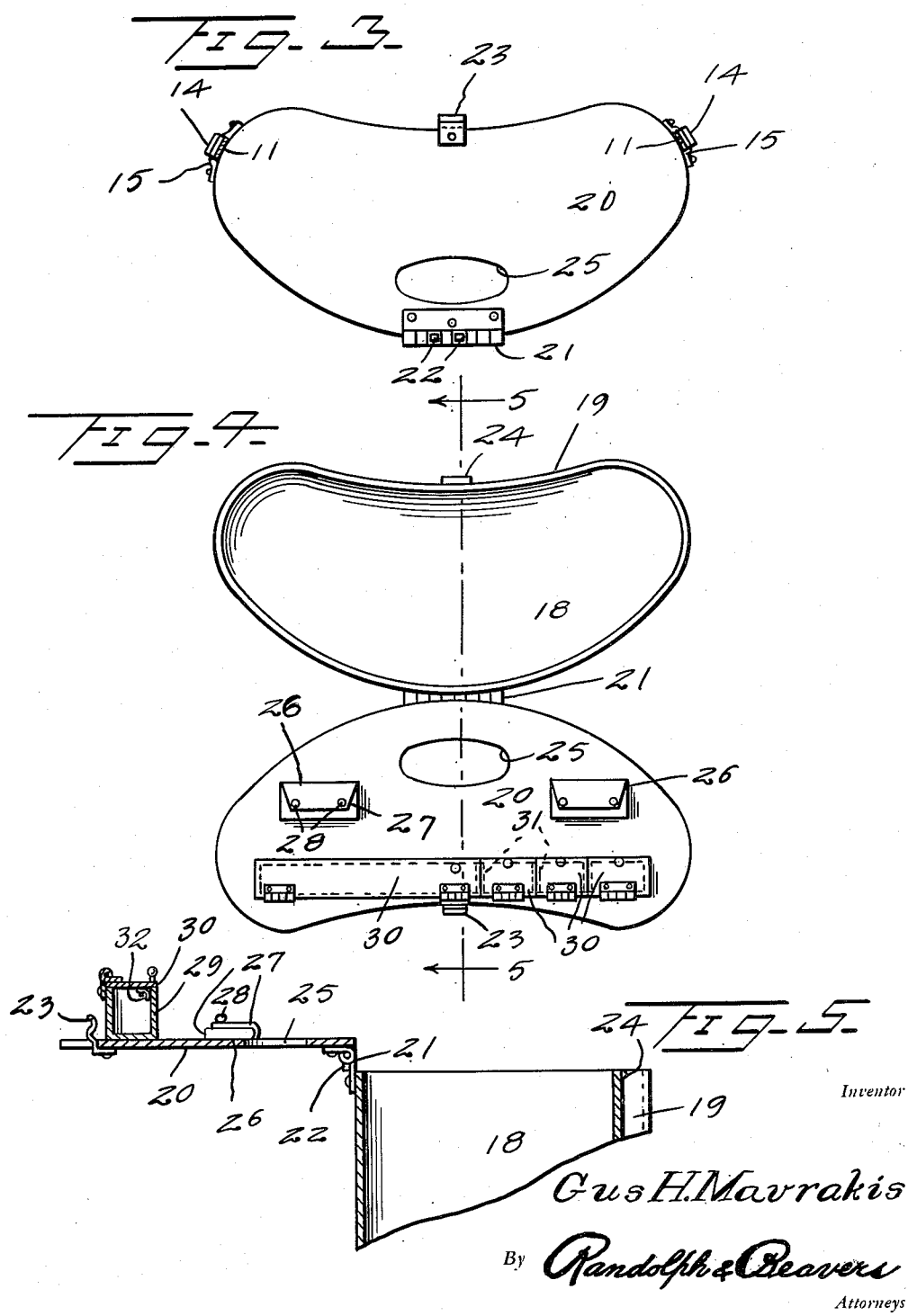
Inventor
Gus H. Mavrakis
By Randolph & Beavers
Attorneys Patented Jan. 16, 1951

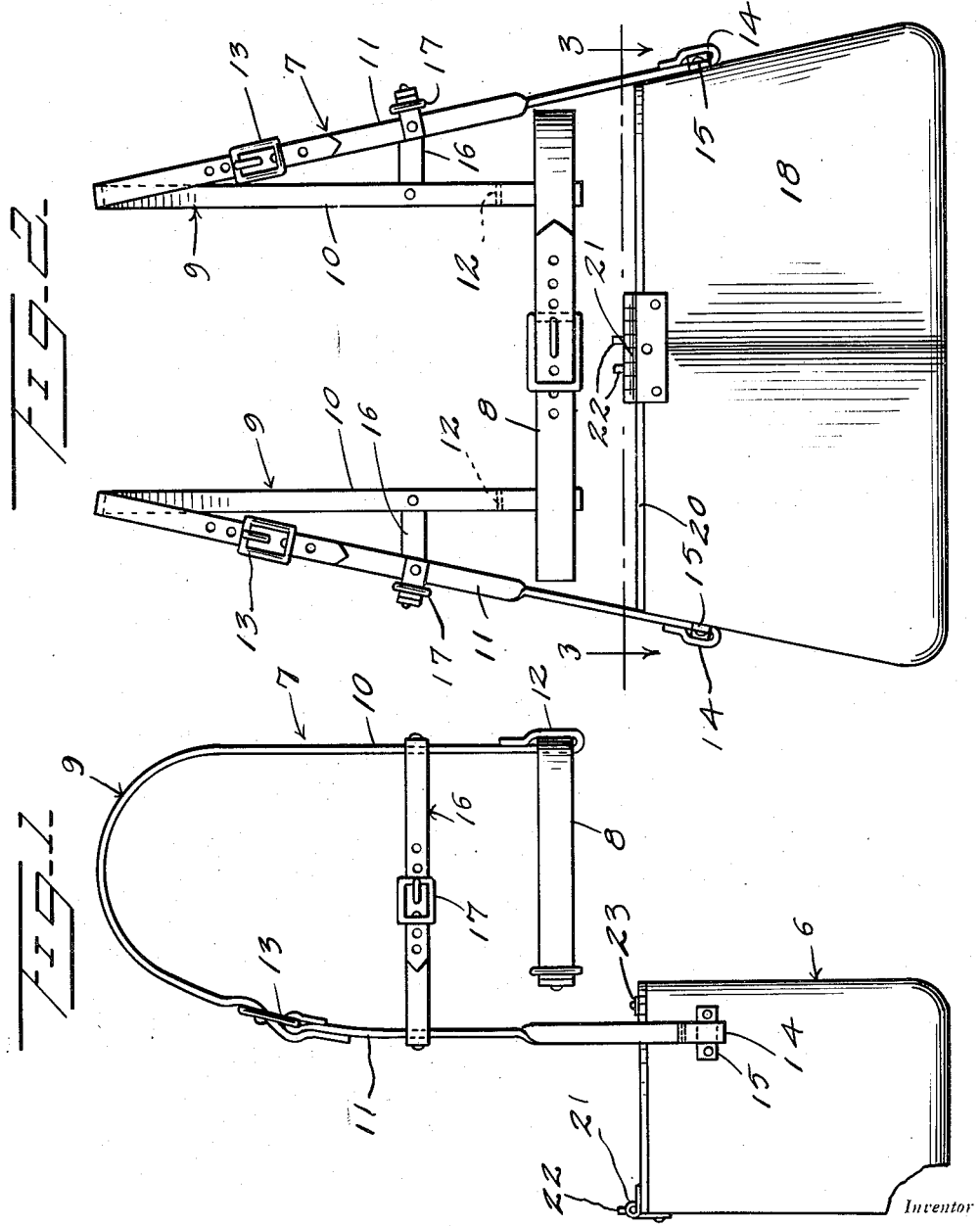

2,538,576

UNITED STATES PATENT OFFICE 2,538,576

FISHING CREEL OR BASKET

Gus H. Mavrakis, Billings, Mont.

Application April 23, 1947, Serial No. 743,393

4 Claims. (Cl. 224—5)

This invention relates to an improved construction of creel or fishing basket including a body supporting harness, and more particularly, has reference to a creel adapted to be worn in front of rather than to the side of the body and having an inner side curved to fit the contour of the abdomen, adjacent to which it is disposed.

More particularly, it is an object of the invention to provide a creel and harness which may be worn with comfort and convenience and which will not interfere with the normal movement of the fishermen in wading streams, luring in and landing a catch, jumping from rock to rock or over ditches or in passing through barbed wire fences or thickets.

Still another and important object of the invention is to provide a creel having an open top which opens in a direction away from the body affording storage means on the underside thereof for fishing tackle and bait and which, when in an applied position, will function as a table or shelf for supporting equipment and bait while changing lures or hooks or applying bait.

Still another object of the invention is to provide a creel and a body supporting harness therefor and which will position the creel so that it may be used as a brace for a fishing rod in landing a fish and a shelf for supporting the fish while removing the hook therefrom and which is provided with an opening for inserting the fish into the body of the creel without opening the top thereof and which is so located with respect to the creel top that the danger of loosing the fish is substantially minimized.

Still a further object of the invention is to provide a creel and body supporting harness so constructed that the creel will be retained in a position tight against the body of the fisherman at all times and will be held in an upright position to reduce the inconvenience incident to the carrying of the creel and to substantially eliminate the possibility of the creel accidentally opening and resulting in the loss of the contents thereof.

Numerous other objects and advantages of the invention will hereinafter become more fully apparent from the following description of the drawings, illustrating a preferred embodiment thereof, and wherein:

Figure 1 is a side elevational view showing the creel and body harness assembled;

Figure 2 is a front elevational view thereof;

Figure 3 is a horizontal sectional view taken substantially along a plane as indicated by the line 3—3 of Figure 2;

Figure 4 is a view similar to Figure 3 but showing the creel in an open position; and Figure 5 is a vertical sectional view taken substantially along a plane as indicated by the line 5—5 of Figure 4.

Referring more specifically to the drawings, 6 designates generally the creel or basket in its entirety and 7 designates generally the body engaging supporting harness thereof.

The harness 7 includes an adjustable waist engaging or body encircling belt 8 and two shoulder straps, each designated generally 9 and each formed of a rear section 10 and a front section 11. The rear sections 10 are provided at complementary ends thereof with loops 12 through which the back portion of the belt 8 extends and said sections 10 extend upwardly therefrom and over the shoulders and have opposite depending ends extending downwardly in front of the shoulders and adjustably connected to buckles 13, fastened to the upper ends of the front sections 11. The front sections 11 depend to below the belt 8 and are provided at their lower ends with loops 14 which are secured to loops 15 fastened to the sides of the creel or basket 6. The front and rear portions 10 and 11 of each of the shoulder straps 9 are also adjustably connected together by side straps, designated generally 16, which are disposed above and adjacent the belt 8 and in substantially parallel planes thereto and which are likewise formed of end sections which are detachably and adjustably connected by buckles 17, so that the supporting harness 7 may be adjusted to fit persons of various sizes and to support the creel or basket 6 at a comfortable level.

The creel or basket 6 includes an upwardly opening body portion 18 which is preferably flared from top to bottom and which is provided with an externally and transversely concaved inner or rear wall 19 which is shaped to fit the contour of the stomach or abdomen, against which it is adapted to be disposed and supported by the harness 7 and in a position directly in front of the body and at a height so that it will not interfere with the movement of the legs incidental to climbing banks, jumping ditches and other movements requiring maximum of leg freedom.

The creel or basket 6 is provided with a substantially flat cover 20 which is shaped to conform to the shape of the open top of the creel body 18 and which is generally crescent shaped with rounded ends, as best illustrated in Figures 3 and 4. The lid or cover 20 is swingably connected at its outer edge intermediate of its ends to the intermediate portion of the top edge of the outer, externally convex wall of the body 18 by a hinge 21 which is provided with a stop 22 to prevent the lid 20 from being swung outwardly beyond its horizontal position of Figure 5 and whereby said lid, when open, as seen in Figures 4 and 5, will provide a supporting tray or shelf. The inner, free edge of the lid 20 is provided with a spring latch 23 for engaging a keeper 24 on the outer side of the concave inner wall 19 for releasably retaining the lid in its closed position, as seen in Figures 1 to 3.

The inner or underside of the lid 20 is provided adjacent its outer, hinged edge with an elongated opening 25 which is disposed intermediate the ends thereof and longitudinally of the lid 20 and through which fish can be inserted into the body 18 of the creel 6 without requiring opening of the cover 20. The under or inner side of the cover 20, as best seen in Figure 4, has one or more flexible containers 26 fastened thereto and which are provided with hinged flaps 27 adapted to be fastened in closed positions by conventional snap fasteners 28 and which are provided for containing leaders, fishing licenses, fly hooks and the like.

The under side of the lid or cover 20 is also provided with an elongated container or box 29 which extends lengthwise thereof and which is disposed adjacent the inner, free edge of said lid. When the lid 20 is disposed in an open position, as seen in Figures 4 and 5, the container or box 29 is disposed with its open top uppermost and said open top is closed by hinged closures 30 one of which is provided for each of the compartments of the container 29 and which are formed by partitions 31 thereof. The smaller compartments of the container 29 are adapted to each contain a different type of bait and the large compartment thereof is provided for containing sinkers, spinners and other fishing tackle and equipment, not shown. The individual lids 30 are provided on their inner sides with spring latches 32, one of which is shown in Figure 5, and which function for retaining said closures in closed positions.

Various modifications and changes are contemplated and may obviously be resorted to, without departing from the spirit or scope of the invention as hereinafter defined by the appended claims.

I claim as my invention:

1. A device of the character described comprising a creel body having an externally concave inner side adapted to be disposed across the front of the body of the wearer for fitting the contour of the stomach or abdomen, a body engaging harness including supporting straps extending over the shoulders and having depending forward ends disposed in front of the body and attached to the creel body for supporting the creel at the front of the body of the wearer, a body encircling belt to which the supporting straps are connected only at their opposite ends and at the back of the body of the wearer, said creel body being provided with a cover for closing the open top thereof, said cover being hingedly connected to the body at its outer edge and arranged to open outwardly relatively to the body of the wearer, said shoulder engaging supporting straps each being formed of adjustably connected end sections for supporting the creel at various levels relatively to the body, and said shoulder engaging straps each being connected by an adjustable side strap extending between the front and back portions thereof and normally disposed in a plane substantially parallel to the body encircling belt and which has an end anchored to each of the sections of the shoulder strap on which it is mounted.

2. A device of the character described comprising a creel adapted to be disposed across the front of the body, and a body engaging supporting harness for supporting the creel comprising a waist encircling belt, a pair of supporting straps adapted to engage over the shoulders of the wearer having depending rear ends provided with loops engaging the rear portion of the belt for anchoring the supporting straps to and forming the sole connection of the supporting straps to the belt, said supporting straps having opposite, forward ends depending below the belt and secured to the creel for supporting the creel at the front of the body of the wearer, each of said supporting straps being provided with an adjustable side strap connected to the front and rear portions thereof and disposed above and substantially parallel to the belt for drawing the front portion of the strap inwardly of the body for retaining the creel in close engagement with the body.

3. A device of the character described comprising a creel adapted to be disposed across the front of the body, and a body engaging supporting harness for supporting the creel comprising a waist encircling belt, a pair of supporting straps adapted to engage over the shoulders of the wearer having depending rear ends provided with loops engaging the rear portion of the belt for anchoring the supporting straps to and forming the sole connection of the supporting straps to the belt, said supporting straps having opposite, forward ends depending below the belt and secured to the creel for supporting the creel at the front of the body of the wearer, each of said supporting straps being formed of adjustable sections, each of said supporting straps being provided with an adjustable side strap connected to the front and rear portions thereof and disposed above and substantially parallel to the belt for drawing the front portion of the strap inwardly of the body for retaining the creel in close engagement with the body.

4. A body engaging harness for supporting a fishing creel comprising a pair of shoulder straps each adapted to extend over a shoulder of the wearer and having a forward and a rear end disposed in front of and behind the body of the wearer, respectively, a waist encircling belt attached to the rear ends only of the shoulder straps for anchoring the shoulder straps to the body of the wearer, the forward ends of the shoulder straps depending to below the belt and being adapted to be connected to a fishing creel for supporting the creel in front of the body of the wearer, and an adjustable side strap connected to the front and rear portions of each of said shoulder straps and disposed above the belt and below the armpit of the wearer.

GUS H. MAVRAKIS.

REFERENCES CITED

The following references are of record in the file of this patent:

UNITED STATES PATENTS

| Number | Name | Date |
| --- | --- | --- |
| 1,492,381 | Lindenmayer | Apr. 29, 1924 |
| 1,689,051 | Richardson et al. | Oct. 23, 1928 |
| 1,737,450 | Burch et al. | Nov. 26, 1929 |
| 2,098,636 | Smith et al. | Nov. 9, 1937 |
| 2,140,688 | Cohn | Dec. 20, 1938 |
| 2,241,992 | Hall | May 13, 1941 |
| 2,271,136 | Geiger | Jan. 27, 1942 |

FOREIGN PATENTS

| Number | Country | Date |
| --- | --- | --- |
| 4,881 | Great Britain | Feb. 26, 1910 |
| 10,333 | Great Britain | of 1915 |